US012607268B2

(12) United States Patent

Magej et al.

(10) Patent No.: US 12,607,268 B2

(45) Date of Patent: Apr. 21, 2026

(54) VALVE ELEMENT, METHOD FOR OPERATING THE VALVE ELEMENT, AND PROCESS VALVE

(71) Applicant: GEMÜ GEBR. MÜLLER APPARATEBAU GMBH & CO. KOMMANDITGESELLSCHAFT, Ingelfingen (DE)

(72) Inventors: Johann Magej, Schwäbisch Hall (DE); Martin Rupp, Mulfingen (DE); Vadim Lechmann, Künzelsau (DE); Maximilian Bauer, Forchtenberg (DE)

(73) Assignee: GEMÜ GEBR. MÜLLER APPARATEBAU GMBH & CO. KOMMANDITGESELLSCHAFT, Ingelfingen (DE)

( * ) Notice: Subject to any disclaimer, the term of this patent is extended or adjusted under 35 U.S.C. 154(b) by 34 days.

(21) Appl. No.: 18/853,785

(22) PCT Filed: Apr. 6, 2023

(86) PCT No.: PCT/EP2023/059227

§ 371 (c)(1),
(2) Date: Oct. 3, 2024

(87) PCT Pub. No.: WO2023/198620

PCT Pub. Date: Oct. 19, 2023

(65) Prior Publication Data

US 2025/0230878 A1      Jul. 17, 2025

(30) Foreign Application Priority Data

Apr. 13, 2022      (DE) ..................... 10 2022 109 061.2

(51) Int. Cl.
*F16K 7/12*          (2006.01)
*F16K 27/02*          (2006.01)
(Continued)

(52) U.S. Cl.
CPC .......... *F16K 7/126* (2013.01); *F16K 27/0236* (2013.01); *F16K 37/005* (2013.01); (Continued)

(58) Field of Classification Search
CPC .... F16K 7/126; F16K 27/0236; F16K 37/005; G01F 1/38; G01F 1/383; G01F 1/34; G01F 1/36; G01F 1/363
(Continued)

(56) References Cited

U.S. PATENT DOCUMENTS

| | | | | | |
|---|---|---|---|---|---|
| 2,283,369 | A | * | 5/1942 | Jacobsen | ................. F16K 7/126 |
| | | | | | 251/275 |
| 3,349,795 | A | * | 10/1967 | Matsutani | ............... F16K 7/126 |
| | | | | | 251/367 |

(Continued)

FOREIGN PATENT DOCUMENTS

| | | |
|---|---|---|
| DE | 102014113655 A1 | 3/2016 |
| DE | 102016011100 A1 | 3/2018 |

OTHER PUBLICATIONS

Written Opinion for application No. PCT/EP2023/059227 dated Oct. 19, 2023 with English translation, 12 pages.

(Continued)

*Primary Examiner* — Minh Q Le

(74) *Attorney, Agent, or Firm* — Carter, DeLuca & Farrell LLP

(57)          ABSTRACT

A valve body for a diaphragm valve having a valve seat is disclosed, wherein at least two walls of the valve body converge on one another towards the valve seat, wherein the at least two walls at least partly delimit a common dry space, and wherein at least one of the walls comprises a recess which is closed fluid-tightly by a sensor device for providing at least one sensor signal.

15 Claims, 4 Drawing Sheets

Figure 1:
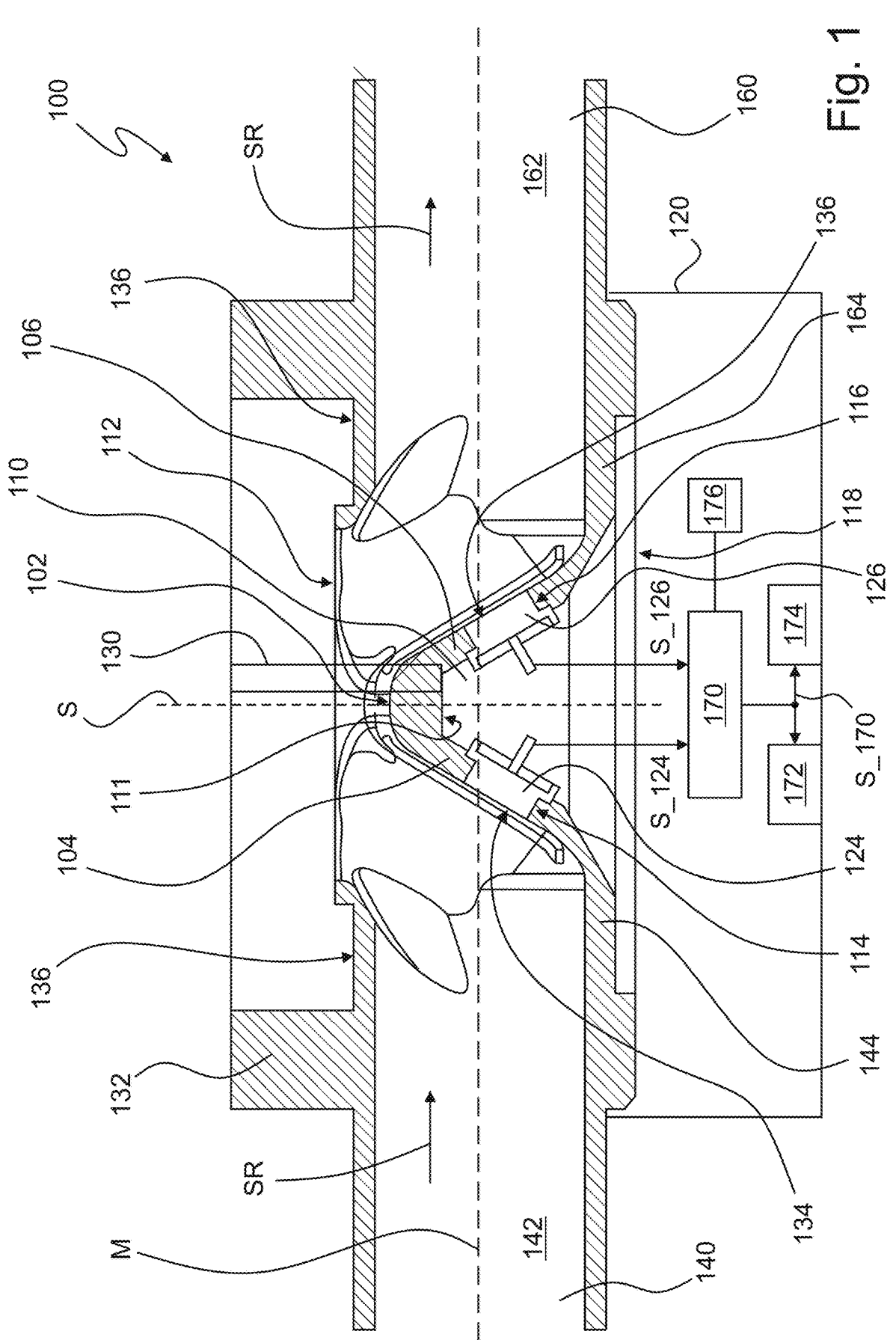

(51) Int. Cl.

| | | |
|---|---|---|
| *F16K 37/00* | (2006.01) | |
| *G01F 1/34* | (2006.01) | |
| *G01F 1/36* | (2006.01) | |
| *G01F 1/38* | (2006.01) | |

(52) U.S. Cl.
CPC .................. *G01F 1/34* (2013.01); *G01F 1/36* (2013.01); *G01F 1/363* (2013.01); *G01F 1/38* (2013.01); *G01F 1/383* (2013.01)

(58) Field of Classification Search
USPC ............. 251/331; 73/861.42; 137/557, 487.5
See application file for complete search history.

(56) References Cited

U.S. PATENT DOCUMENTS

| | | | |
|---|---|---|---|
| 8,616,234 | B2 | 12/2013 | Ringer et al. |
| 8,794,595 | B2 * | 8/2014 | Reed ....................... F16K 7/126 |
| | | | 137/552 |

| | | | | |
|---|---|---|---|---|
| 2009/0101213 | A1* | 4/2009 | Kielb ........................ | G01F 1/42 |
| | | | | 700/282 |
| 2013/0341550 | A1* | 12/2013 | Fukano .............. | F16K 31/1221 |
| | | | | 251/331 |
| 2015/0219233 | A1 | 8/2015 | Ringer | |
| 2016/0082486 | A1* | 3/2016 | Beck ....................... | B08B 7/028 |
| | | | | 137/237 |
| 2017/0225021 | A1 | 8/2017 | Williams et al. | |
| 2018/0031143 | A1* | 2/2018 | Cucciniello ............. | F16K 31/60 |
| 2018/0163896 | A1* | 6/2018 | Mueller .............. | F16K 37/0083 |
| 2023/0366472 | A1* | 11/2023 | Iimura ...................... | F16K 7/17 |
| 2024/0416165 | A1* | 12/2024 | Hagbi .................... | F16K 7/126 |
| 2025/0189045 | A1* | 6/2025 | Yi ........................ | F16K 31/1221 |

OTHER PUBLICATIONS

International Search Report for PCT/EP2023/059227 dated Jul. 18, 2023, 2 pages.
Search report of Priority Application No. DE 102022109061 dated Jan. 11, 2023 with English translation, 19 pages.

* cited by examiner

VALVE ELEMENT, METHOD FOR OPERATING THE VALVE ELEMENT, AND PROCESS VALVE

The invention relates to a valve body, a method for operating the valve body and a process valve.

The problems of the prior art are solved by a valve body according to claim 1, by a method according to a dependent claim and by a process valve according to a further dependent claim.

One aspect of the description relates to the following subject matter:

A valve body for a diaphragm valve having a valve seat, wherein at least two walls of the valve body converge on one another towards the valve seat, wherein the at least two walls at least partly delimit a common dry space, and wherein at least one of the walls comprises a recess which is closed fluid-tightly by a sensor device for providing at least one sensor signal.

The valve body provided has a number of advantages. On the one hand, the sensor device is small because the sensors are arranged in the region of the dry space within an envelope of the fluid duct or fluid chamber surrounding the valve seat. On the other hand, the sensor device is arranged close to the valve seat, which makes it possible to observe the dynamic fluid processes in the vicinity of the seat.

An advantageous example is characterized in that a fluid-exposed sensor surface of the at least one sensor device follows an inner contour of the associated fluid chamber surrounding the sensor surface.

Advantageously, no flow-related disadvantages arise from the provision of the sensor device.

An advantageous example is characterized in that the valve body has a first opening which leads to the valve seat or allows a view of it, that the valve body has a second opening opposite the first opening which leads into the dry space, and that the second opening is closed by means of a cover.

The cover advantageously protects the dry space and the components associated with the sensor device arranged therein from environmental influences and manipulation.

An advantageous example is characterized in that the other of the walls comprises a further recess which is closed with a further sensor device for providing at least one further sensor signal.

Advantageously, a measurement can be carried out on both sides, in particular when the valve is closed.

An advantageous example is characterized in that the two sensor devices are arranged equidistant from the web-shaped valve seat.

Advantageously, the equidistant spacing of the sensor devices in relation to the seat contour allows for operation of the valve body in both flow directions, wherein the sensor signals remain evaluable. The symmetrical arrangement means that the sensing works advantageously for both possible flow directions. This simplifies the assembly of the valve body, as there is no preferred direction, at least with regard to the sensor devices.

An advantageous example is characterized in that the flow direction is oriented from a first fluid connection in the direction of a second fluid connection, wherein the sensor device facing the first fluid connection is arranged closer to the valve seat than the sensor device facing away from the first fluid connection.

Advantageously, the sensor device facing the inlet is placed closer to the valve seat, i.e., on the upstream side. There, pressure conditions that are more advantageous for the measurement, for example higher pressures than in the surroundings, can be measured, which improves the measurement accuracy, in particular with regard to pressure measurements.

An advantageous example is characterized in that the valve body comprises an evaluation unit which is designed to determine a further variable based on the at least one sensor signal or based on the at least one sensor signal and based on the at least one further sensor signal.

Advantageously, the evaluation unit carries out an evaluation close to the valve body, which means that a further processed variable is already available in the region of the valve body.

An advantageous example is characterized in that the valve body comprises a display unit for the visible representation of the at least one further variable and/or the at least one sensor signal.

An advantageous example is characterized in that the valve body comprises a communication interface, which is designed in particular as a wired interface with a plug connector or as a wireless interface, which is configured to send the at least one further variable and/or the at least one sensor signal.

An advantageous example is characterized in that the valve body has a cable duct which leads out of the dry space, in particular in the direction of a valve drive, i.e., to the side of the opening, wherein at least one line for guiding the at least one sensor signal and/or the at least one further variable is arranged within the cable duct.

Advantageously, the sensor signal and/or the additional variable determined by the evaluation unit can be led away from the dry space in order to be evaluated or displayed elsewhere. On the other hand, the valve position or actual position of the shut-off device, in particular the valve diaphragm, can be picked up on the drive side via the at least one sensor signal and used to determine the actual volume flow.

An advantageous example is characterized by the fact that the cable duct connects the dry space and a connection region for a valve drive.

Advantageously, the cable carrying the sensor signal can be contacted in the region of the connection region for the valve drive and routed further in the direction of the valve drive and a control unit arranged there.

One aspect of the description relates to the following subject matter:

A method for operating the valve body in accordance with the previous aspect, the method comprising: determining an actual volume flow based on the at least one sensor signal representing a first medium pressure, based on the at least one further sensor signal representing a second medium pressure and based on a signal representing an actual position of a shut-off device of the process valve, and providing, in particular displaying and/or transmitting, the actual volume flow.

Another advantageous example is characterized in that the method comprises: determining an accumulated volume based on the determined volume flow; and providing, in particular displaying and/or transmitting, the accumulated volume.

An advantageous example is characterized in that the method additionally comprises: receiving a target volume flow for the process valve; and determining a target position for the valve diaphragm based on the actual volume flow and based on the target volume flow.

Figure 2:
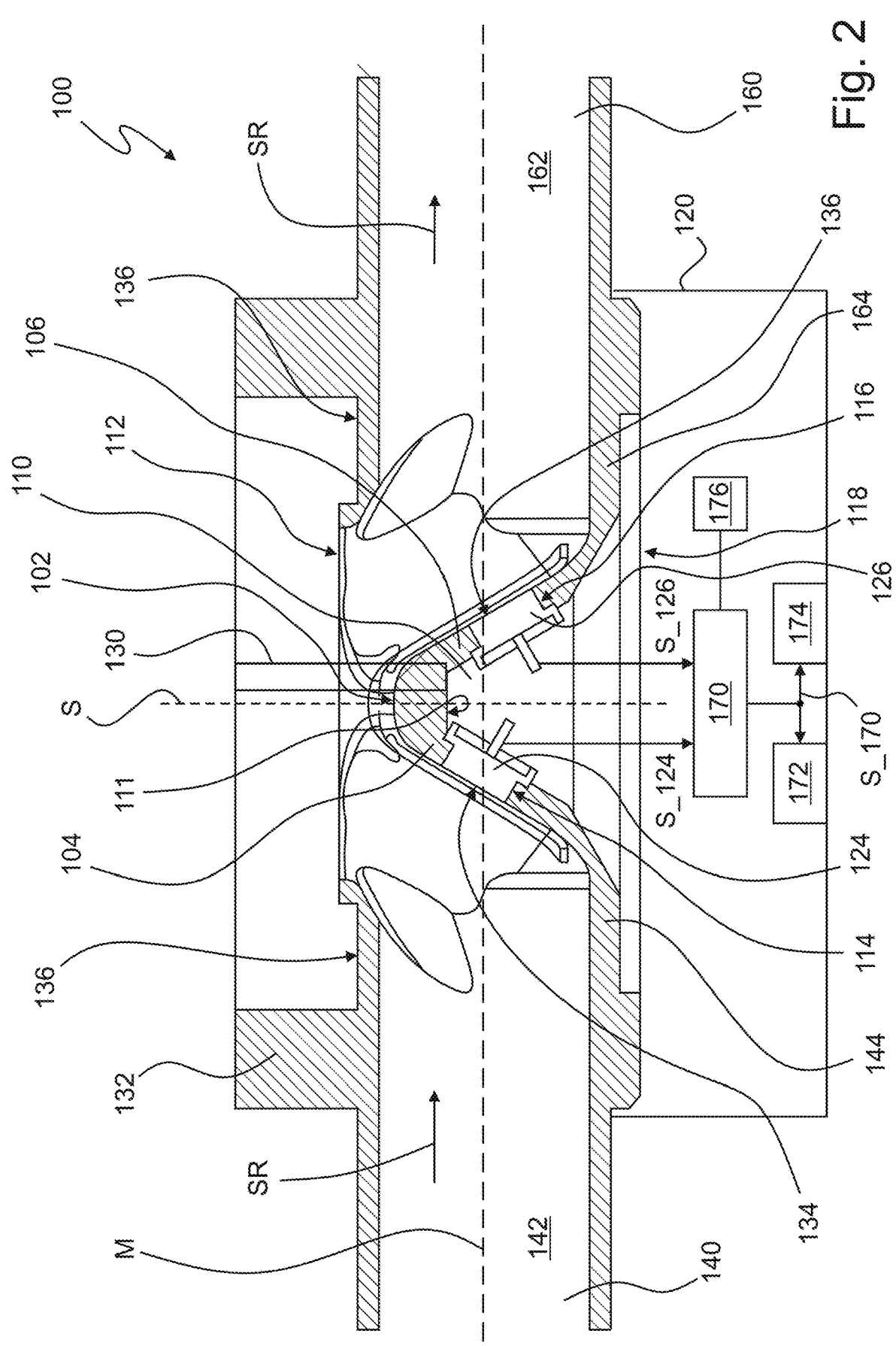
Figure 3:
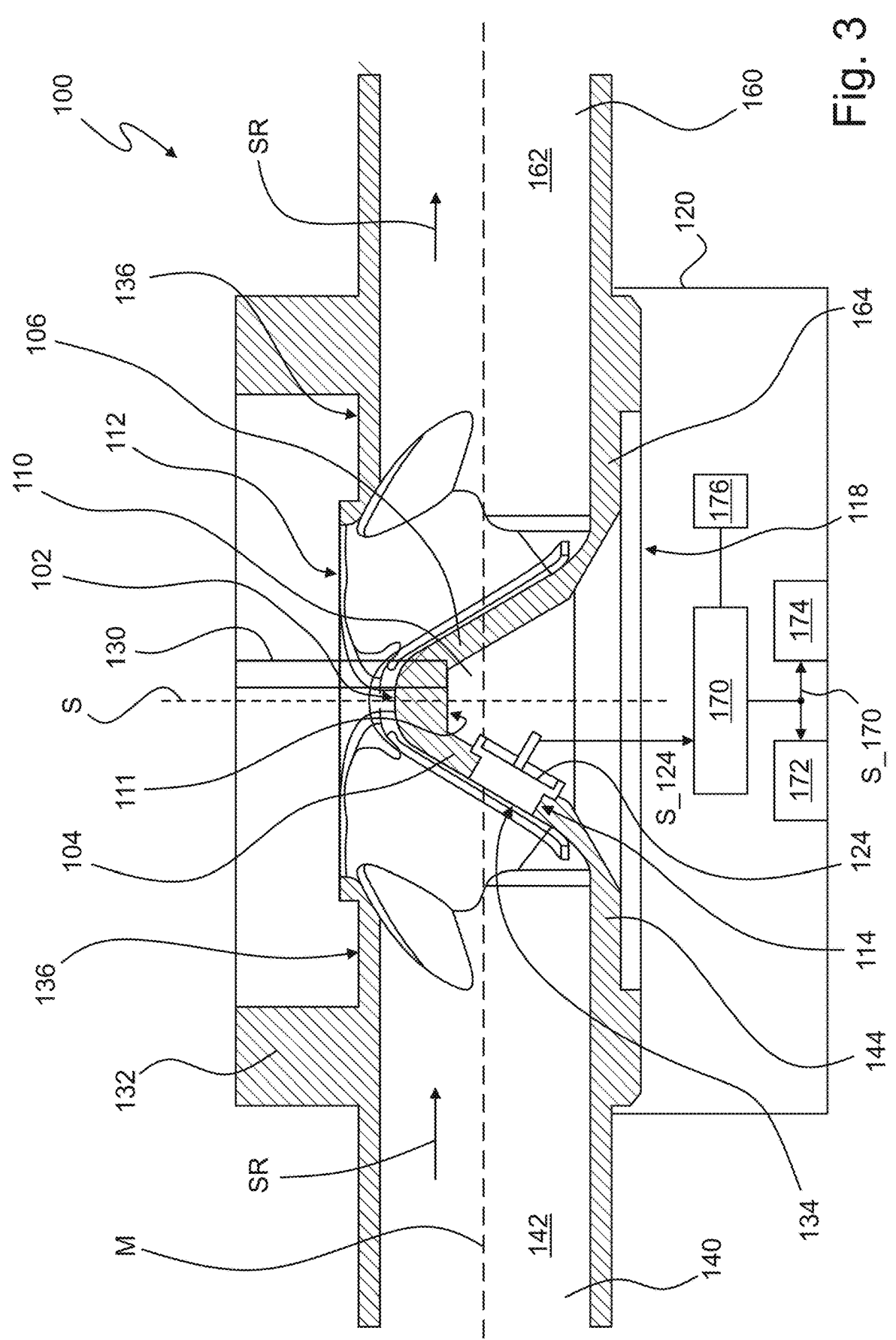

In the drawing:

FIGS. 1 to 3 each show an example of a valve body; and

Figure 4:
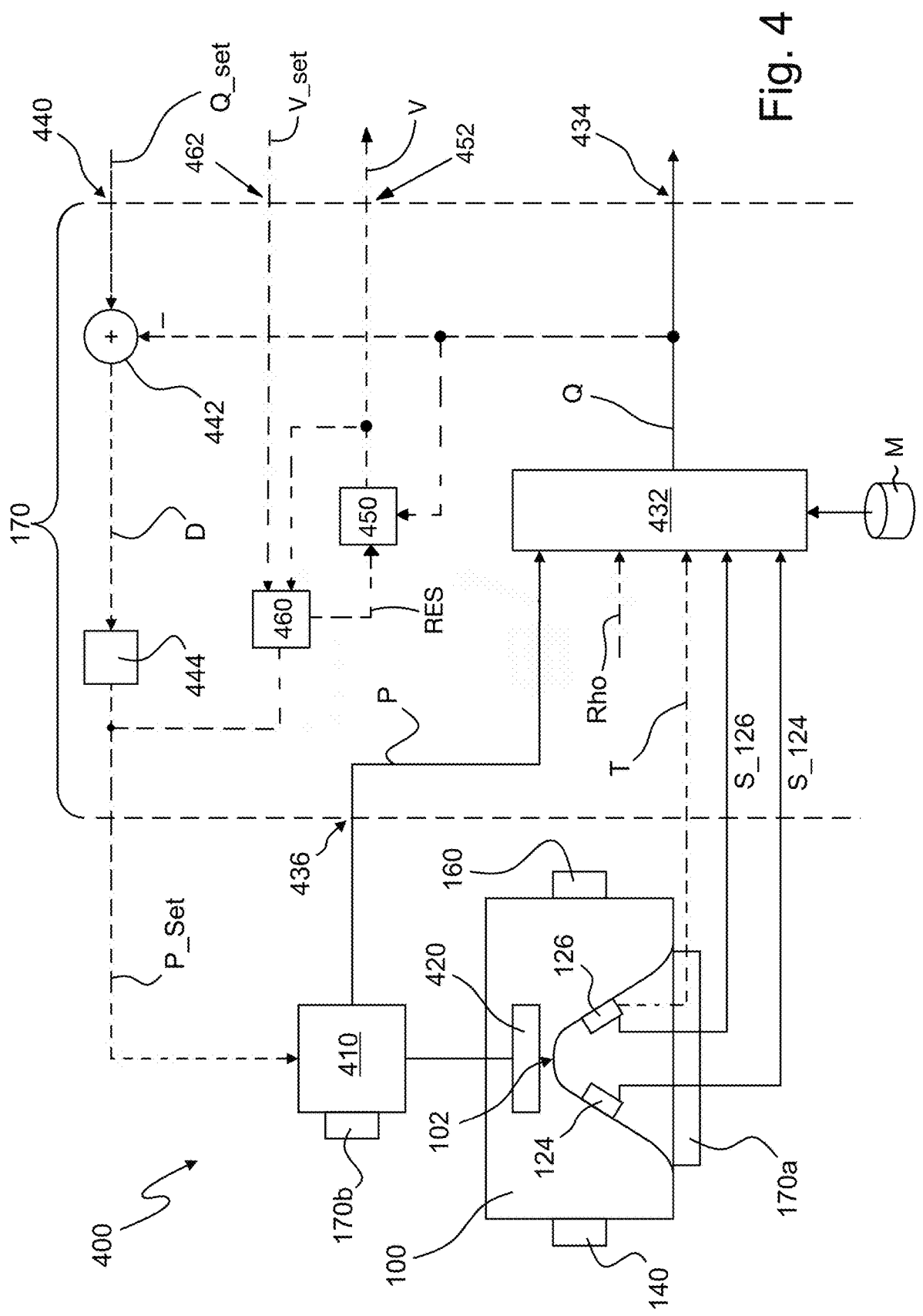

FIG. 4 shows a schematic view of a process valve and a block diagram for operating the valve body or the process valve.

FIG. 1 shows a longitudinal section of a valve body 100 for a diaphragm valve with a valve seat 102 which has a web-shaped concave contour. Two walls 104, 106 of the valve body 100 run towards each other from a bottom of a respective fluid chamber 142, 162 opposite the valve seat 102 towards the valve seat 102, wherein the at least two walls 104, 106 at least partly delimit a common dry space 110. The walls 104, 106 comprise a corresponding recess 114, 116, which is closed fluid-tightly with an associated sensor device 124, 126 for providing at least one sensor signal S_124, S_126.

A first fluid connection 140 leads into the first fluid chamber 142. A second fluid connection 160 leads into the second fluid chamber 162. The web-like convex seat contour of the valve seat 102 separates the two fluid chambers 142 and 162 from one another. The walls 104 and 106 connect the valve seat 102 with a wall 144, 164 of the respective fluid chamber 142, 162 opposite the valve seat 102. The two walls 104, 106 thus taper in particular sharply in the longitudinal section of the valve body 100 shown or in a section perpendicular to the course of the web-like valve seat 102 and thus meet in the valve seat 102. In the opposite direction, the walls merge into walls of the fluid ducts, which run parallel to the central longitudinal axis M.

A corresponding fluid-exposed sensor surface 134, 136 of the sensor device 124, 126 follows an inner contour of the associated fluid chamber 142, 162 surrounding the sensor surface 134, 136. For example, the sensor surface 134, 136 is flush with the surrounding inner surface of the fluid chamber 142, 162. In the example shown, the sensor surface 134, 136 is flat.

An imaginary main flow direction SR in a fluid chamber 142, 162 or an axis parallel to the central longitudinal axis M and the fluid-exposed sensor surface 134, 136 of the sensor device 124, 126 encloses, for example, an angle between 20° and 45°, in particular between 30° and 40°, in a section perpendicular to the course of the valve seat 102. Thus, the sensor surface 134, 136 is inclined to the associated main flow direction. Advantageously, the sensor surface 134, 136 is located in the fluid flow so that measured values can be detected in or near the main flow region. On the other hand, the sensor surfaces 134, 136 are positioned in flow regions favorable for differential pressure measurement due to their inclination to the associated main flow direction.

The valve body 100 comprises a first opening 112, which leads to the valve seat 102 or provides a view of it. The valve body 100 comprises a second opening 118 opposite the first opening 112, which leads into the dry space 110, wherein the second opening 118 is closed by means of a cover 120. The dry space 110 separated from the fluid chambers 142, 162 thus has the closable second opening 118, which leads into the dry space 110 and to a dry side of the respective sensor device 124, 126, in particular to an electrical contact of the respective sensor device 124, 126.

The dry space 110 extends from the opening 118 across the central longitudinal axis M of a fluid chamber 142, 162 to a bottom 111. The bottom 111 is arranged on the opposite side of the valve seat 102.

When the cover 120 is closed, the dry space 110 is delimited by the walls 104 and 106, the cover and the sensor devices 124 and 126. In the example shown, the cover 120 is designed like a hood. Of course, the cover 120 can also be flat, in particular disc-shaped, in order to save installation space.

In the case of the two sensor devices 124, 126 shown in FIGS. 1 and 2, the other of the walls 106 comprises the further recess 116, which is closed with the further sensor device 126 for providing at least one further sensor signal S_126. In FIG. 1, the two sensor devices 124, 126 are arranged equidistant from the web-shaped valve seat 102. The first and the second sensor device 124, 126 are thus arranged symmetrically to an imaginary center plane spanned by the seat contour of the valve seat 102 and by an adjusting axis S.

The valve body 100 comprises an evaluation unit 170, which is designed to determine a further variable S_170 based on the at least one sensor signal S_124 or based on the at least one sensor signal S_124 and based on the at least one further sensor signal S_126.

The valve body 100 comprises a display unit 172 for the visible representation of the at least one further variable S_170 and/or the at least one sensor signal S_124, S_126.

The valve body 100 comprises a communication interface 174, which is designed, for example, as a wired interface with a plug connector or as a wireless interface. The communication interface 174 is configured to send the at least one further variable S_170 and/or the at least one sensor signal S_124, S_126. The additional variable S_170 is, for example, an actual volume flow or a flow direction.

In the example shown, the evaluation unit 170 is arranged within a space which is defined by the dry space 110 and the cover 120. Alternatively, the evaluation unit 170 can also be arranged outside this space, for example in the region of the drive or away from the diaphragm valve, or inside the dry space 110.

For power supply, the valve body 100 has an accumulator 176 or a battery. Alternatively or additionally, a line-based energy supply can be provided.

In one example, autonomous energy generation takes place from temperature differences of the valve body in order to supply the evaluation unit 170 or the accumulator 176 with electrical energy.

In the example shown, the valve body 100 has a cable duct 130 which leads out of the dry space 110, in particular in the direction of a valve drive 410, i.e., to the side of the opening 112. The cable duct 130 connects the dry space 110 and a connection region 132 for the valve drive. At least one line for guiding the at least one sensor signal S_124, S_126 and/or the at least one further variable S_170 is arranged within the cable duct 130. In addition, a power supply line can be routed via the cable duct 130.

The connection region 132 frames the opening 112. Between the connection region 132 and the opening 112, a clamping portion 136 in the form of a surface is arranged, against which a diaphragm in the outer clamping region is pressed and creates the seal to the outside. The clamping portion 136 is raised in the direction of the opening 112.

In one example, the corresponding sensor device 124, 126 comprises at least one or more of the following additional sensors: a pressure sensor for providing the sensor signal representing a process medium pressure, a temperature sensor for providing the sensor signal representing a process medium temperature, a turbidity sensor for providing the sensor signal representing the turbidity of the process medium, a conductivity sensor for providing the sensor signal representing the conductivity of the process medium, a pH sensor for providing the sensor signal representing a pH value of the process medium, a color sensor for providing the sensor signal representing a color of the process medium. The position of the other sensors mentioned above may differ from positions 134 and 136. For the above-mentioned measured variables, the position of the corresponding additional sensor can also be located away from the slopes in the fluid chamber 143/162.

FIG. 2 shows, in contrast to FIG. 1, that the sensor devices 124, 126 are spaced at different distances from the valve seat 102. The flow direction SR is oriented from the first fluid connection 140 towards the second fluid connection 160. The sensor device 124 facing the first fluid connection 140 is arranged closer to the valve seat 102 than the sensor device 126 facing away from the first fluid connection 140.

Of course, the corresponding position of the sensor devices 124, 126 may differ from the positions shown. For example, one of the sensor devices 124, 126 may be arranged remotely from the dry space 110 or the location of the arrangement may vary in relation to the dry space 110 and in relation to the sealing web 102. In particular, the position of the corresponding sensor device 124, 126 is adapted to the expected flow and pressure conditions of the fluid duct surrounding the sealing web 102 and its inner contour.

In contrast to FIGS. 1 and 2, FIG. 3 shows that only a single sensor device 124 is present and is assigned to the dry space 110. Shown is an operating mode in which the sensor device 124 is arranged on the upstream side.

In an example (not shown), the sensor device 124 is arranged on the opposite side of the sealing web 102, i.e., in the flow direction after the sealing web 102. This embodiment is advantageous, for example, when the pressure on the upstream side is known from another source and is determined, for example, by a further sensor device on the upstream side, which is arranged away from the dry space 110.

FIG. 4 shows the process valve 400 in schematic form and a block diagram for a method for operating the process valve 400 or for operating the valve body 100 by means of the evaluation unit 170. The evaluation unit 170 is arranged, for example, at a position 170a, i.e., on the valve body 100 opposite the valve drive 410, or at the position 170b, i.e., on or near the valve drive 410.

A position of a valve diaphragm 420 driven by a valve drive 410 together with the valve seat 102 of the valve body 100 determines an effective opening cross section of the process valve 400. A receiving unit 436 receives an actual position P of a valve diaphragm 420 of the process valve 400 or the valve drive 410. Alternatively, another variable representing the actual position P can be used, such as the parameter P_set explained below.

A determination unit 432 is configured to determine an actual volume flow Q based on the at least one first medium pressure-representing sensor signal S_124 and based on the at least one further sensor signal S_126 representing a second medium pressure and a signal representing an actual position P of the shut-off body, i.e., the diaphragm 420. A provision unit 434 is set up in particular for displaying and/or for transmitting the actual volume flow Q by data technology. The actual volume flow Q is therefore determined based on the first and second process medium pressure, in particular based on a difference between the two pressures, and based on a valve position or actual position P.

For compressible media, the previous determination additionally determines a density Rho of the process medium and a detected temperature of the process medium, which is provided via at least one of the sensor devices 124, 126. In one example, the temperature can also be assumed to be fixed. For non-compressible media, the aforementioned parameters do not need to be taken into account, which is why these signal paths are shown in dashed lines.

To determine the actual volume flow, the determination unit 432 accesses previously determined data which are stored on a storage unit M. The pre-determined data comprise, for example, a valve body-specific characteristic map, a machine-trained function or comprises parameters of a function to determine the actual volume flow Q from the input data supplied to block 432.

In addition to the process valve-related determination, display and data transmission of the actual volume flow Q, there are further application scenarios for the determined actual volume flow Q, the signal paths of which are shown in dashed lines.

For volume flow control, a receiving unit 440 receives a target volume flow Q_set for the process valve 400. This can, for example, be entered manually on the process valve 400 or specified by a central system control. To control the volume flow, a difference D between the actual volume flow Q and the target volume flow Q_set is determined at the addition point 442. Depending on the difference D, a controller 444 determines the target position P_set or a control signal for the drive 410.

Another example comprises volume counting. This comprises determining 450 an accumulated volume V based on the determined volume flow Q over time. The determined volume flow V is then provided 452, in particular shown on a display and/or transmitted to another unit of the system.

In one example, the flow direction is determined based on the sensor signals S_124, S_126, which represent a respective fluid pressure. This can be done by simply calculating the difference. If the amount is positive, a first flow direction exists; if the amount is negative, a second flow direction exists. The flow direction can be displayed, for example, on the valve body or on the valve by means of the display unit.

In another example, a flow rate is determined based on the sensor signals S_214, S_126. The flow velocity or flow rate is determined using the determined fluid pressure and the Navier-Stokes equations or a function representing them. In an example, the flow rate will be displayed on the valve body or on the valve by means of the display unit.

Furthermore, the determination of the volume V flowing through the valve body 100 can be used to dose the process fluid. For this purpose, a filling volume V_set is transmitted 462 to a unit 460. The unit 460 monitors the current value of the volume V. If the filling volume V_set is reached by the accumulated volume V, the unit 460 determines the signal P_Set to close the process valve 400 and resets the accumulated volume to zero via a reset signal RES. A new filling process is started by re-applying the filling volume V_set or a separate signal.

The invention claimed is:

1. A valve body for a diaphragm valve having a valve seat, wherein at least two walls of the valve body converge on one another towards the valve seat, wherein the at least two walls at least partly delimit a common dry space, and wherein at least one of the walls comprises a recess which is closed fluid-tightly by a sensor device for providing at least one sensor signal.

2. The valve body according to claim 1, wherein a fluid-exposed sensor surface of the at least one sensor device follows an inner contour of the associated fluid chamber surrounding the sensor surface.

3. The valve body according to claim 1, wherein the valve body has a first opening which leads to the valve seat or allows a view of it, and wherein the valve body has a second opening opposite the first opening which leads into the dry space, and wherein the second opening is closed by means of a cover.

4. The valve body according to claim 1, wherein the other of the walls comprises a further recess which is closed with a further sensor device for providing at least one further sensor signal.

5. The valve body according to claim 4, wherein the two sensor devices are arranged equidistant from the web-shaped valve seat.

6. The valve body according to claim 4, wherein the flow direction is oriented starting from a first fluid connection in the direction of a second fluid connection, and wherein the sensor device facing the first fluid connection is arranged closer to the valve seat than the sensor device facing away from the first fluid connection.

7. The valve body according to claim 1, wherein the valve body comprises an evaluation unit which is designed to determine a further variable based on the at least one sensor signal or based on the at least one sensor signal and based on the at least one further sensor signal.

8. The valve body according to claim 1, wherein the valve body comprises a display unit for the visible representation of the at least one further variable and/or the at least one sensor signal.

9. The valve body according to claim 1, wherein the valve body comprises a communication interface, which is designed as a wired interface with a plug connector or as a wireless interface, which is configured to send the at least one further variable and/or the at least one sensor signal.

10. The valve body according to claim 1, wherein the valve body has a cable duct which leads out of the dry space in the direction of a valve drive that is to the side of the opening, and wherein at least one line for guiding the at least one sensor signal and/or the at least one further variable is arranged within the cable duct.

11. The valve body according to claim 10, wherein the cable duct connects the dry space and a connection region for a valve drive.

12. A method of operating the valve body according to claim 1, the method comprising:

determining an actual volume flow based on the at least one sensor signal representing a first medium pressure, based on the at least one further sensor signal representing a second medium pressure and based on a signal representing an actual position of a shut-off device of the process valve; and displaying and/or transmitting the actual volume flow.

13. The method according to claim 12, wherein the method additionally comprises:

receiving a target volume flow for the process valve;

determining a target position for the valve diaphragm based on the actual volume flow and based on the target volume flow; and operating the process valve based on the determined target position.

14. The method according to claim 12, further comprising:

determining an accumulated volume based on the determined volume flow; and displaying and/or transmitting the accumulated volume.

15. A process valve comprising the valve body according to claim 1.

* * * * *